Patented Aug. 18, 1953

2,649,429

UNITED STATES PATENT OFFICE 2,649,429

VULCANIZATION

Julian R. Little, Packanack Lake, N. J., assignor to United States Rubber Company, New York, N. Y., a corporation of New Jersey No Drawing. Application January 30, 1951,
Serial No. 208,658

18 Claims. (Cl. 260—41.5)

This invention relates to the vulcanization of synthetic rubber selected from the group consisting of polymers of aliphatic conjugated diolefins and copolymers of aliphatic conjugated diolefins and other copolymerizable monomeric material, which copolymers contain copolymerized therein at least 25% of aliphatic conjugated diolefin, by means of compounds derived from phenol by substituting at least two of the three positions ortho and para to the phenolic hydroxyl group with —CH₂A groups, where A is a di-substituted amino radical, by heating a mixture of the rubber, one of said derivatives, and carbon black under vulcanizing conditions.

A further aspect of the present invention relates to effecting such vulcanization in the presence of certain chemicals which function as vulcanization accelerators and which are capable of increasing the rate of vulcanization by the phenol derivatives mentioned above up to a value double the rate obtained in the absence of such accelerators.

The method of the present invention comprises heating a mixture of synthetic rubber of the type defined above, carbon black in an amount equal to at least about 15 parts per 100 parts of said rubber, and the above defined phenol derivative.

The vulcanizing agent of the present invention can be any compound derived from phenol by substituting any two or all three of the positions ortho and para to the phenolic hydroxyl group with —CH₂A groups, A being a di-substituted amino radical. The amino radical represented by A can be designated as

where R and R' are either alkyl, especially lower alkyl (by which is meant alkyl groups containing from 1 to 6 carbon atoms), aralkyl or hydroxyalkyl, especially lower hydroxyalkyl, or where R and R' are groups which together with the N form a heterocyclic ring, especially a six-membered ring as is the case when A is a 1-morpholinyl or a 1-piperidyl radical.

The phenol derivative used can be substituted in positions other than those occupied by the hydroxyl and the —CH₂A groups with other groups which do not injure the effectiveness of the derivative as a vulcanizing agent. The preferred substituent group is an alkyl group, especially lower alkyl.

Examples of compounds which are useful vulcanizing agents in accordance with my invention include the following:

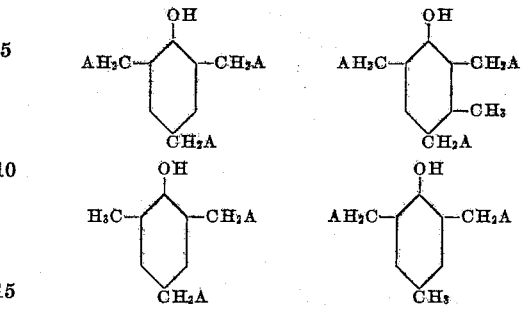

where A is a di-substituted amino radical as defined above.

The vulcanizing agents used in my invention can easily be made by synthetic procedures well-known in the art. Typically, they are made by reacting a phenol or a substituted phenol, especially an alkyl phenol, such as a cresol or mixture of cresols, with formaldehyde and with a secondary amine having the formula

where R and R' are as stated above.

While the phenol derivatives of the present invention are generally employed as such, they can be employed in the form of their salts in which the amino groups are the salt-forming groups, particularly the salts formed with alkyl halides or alkanoic acids. However, the use of such salts offers no advantage over the free phenol derivatives themselves.

The vulcanizing agents of the present invention can be used in widely varying amounts. I prefer, however, to use from 0.25 to 8 parts of the phenol derivatives of the present invention per 100 parts of rubber.

It is essential that at least about 15 parts of carbon black be used per 100 parts of the rubber. The type of carbon black is not critical. The black can be any of the reinforcing, semi-reinforcing or non-reinforcing carbon blacks commonly used in the rubber industry. It can be made by any suitable process. Examples are channel blacks and furnace blacks. Acetylene black also is operative even though it is the least reinforcing of the rubber blacks. Examples of commercial blacks which can be used include Philblack O, Wyex, Kosmos 80, Statex B, Spheron 6, P-33, Thermax and Shawinigan. Of course, the physical properties of the vulcanizates will vary considerably depending upon the type of carbon black used, as is well-known to anyone skilled in rubber compounding. So far as vulcanization is concerned, the maximum amount of carbon black is not critical. However, those skilled in the art will understand that the practical maximum is that figure at which the physical properties of the vulcanizate begin to fall off objectionably.

Examples of synthetic rubber to which my invention is applicable include copolymers of butadiene and styrene made by either the standard, i. e., hot, process or the cold process; copolymers of butadiene and acrylonitrile, copolymers of butadiene and methyl acrylate, and homopolymers of aliphatic conjugated diolefins typified by butadiene. My invention can be applied to any rubbery copolymer of an aliphatic conjugated diolefin and another copolymerizable monomer, which copolymer contains copolymerized therein at least 25% of said diolefin. The synthetic rubber used must possess substantial olefinic unsaturation in order that it be vulcanized by the phenol derivatives of the present invention.

The synthetic rubber, carbon black and phenol derivative, together with any other desired materials such as other non-reinforcing fillers, or accelerators of the type described below, are intimately mixed in any convenient manner used in the rubber industry, e. g., on a rubber mill or in an internal mixer. The compounded rubber is then converted to any desired shape and size and is vulcanized at 150 to 250° C., preferably at 165 to 225° C., in any well-known manner as in a mold under pressure or in an open container in an oven.

A further feature of my invention comprises the addition of an alkanolamine, such as monoethanolamine, diethanolamine, or triethanolamine, as a vulcanization accelerator to the rubber-phenol derivative-carbon black mixture. The use of such accelerators greatly increases the rate of vulcanization, and in many cases the time of vulcanization can be halved in this manner.

The amount of alkanolamine used as accelerator can vary widely but preferably ranges from 0.5 to 10 parts per 100 parts of the rubber.

The vulcanization procedure of the present invention has many advantages over previously known vulcanizing processes. Among these are the following:

1. The rubber stocks vulcanized by the new process of my invention have a far better resistance to oxidative aging than does rubber vulcanized with sulfur. For example, when aged in air at 100° C., the new stocks of my invention deteriorate less than one-third as rapidly as a standard sulfur stock. Thus, these new stocks are especially useful in products which must be kept for considerable periods of time at high temperatures. Such products are curing bags for tires, rubber motor mountings, steam hose, gaskets and belts for hot machinery, conveyor belts for moving hot materials, flexible hot air ducts, hot water bottles, etc.

2. The new stocks of the present invention may be used in contact with metals such as copper, silver, etc. which are tarnished by stocks vulcanized by sulfur. The advantages of using these new non-sulfur vulcanizates for rubber-metal objects; e. g., composite rubber and metallic cloth or fabric articles, rubber-insulated wire, head lights, silverware, copperware, etc. are obvious.

3. By carrying out the vulcanization in the presence of carbon black, the amount of the phenol derivatives used as vulcanizing agents can be kept so low as to be commercially practical. For example, as indicated above, amounts ranging from 0.25 to 8 parts per 100 parts of rubber are eminently feasible. Prior art workers such as Van der Meer—Dutch Patent 58,664, and Rubber Chemistry and Technology, 18, 853-73 (1945) and 20, 173-181 (1947)—reported that in most cases 40 to 50 parts of a phenolic compound were needed to vulcanize rubber in the absence of carbon black. It is well-known that the addition of carbon black to a stock containing sulfur as the vulcanizing agent decreases the effectiveness of the accelerator and stearic acid; i. e., that more of each is required in a rubber stock containing carbon black than in a gum rubber stock, to attain equivalent vulcanization. Furthermore, the sulfur level cannot be decreased because of the presence of the carbon black. Consequently, the great increase in the effectiveness of the phenolic vulcanizing agents of my invention as a result of the addition of carbon black was unexpected.

4. Previously, phenolic derivatives in which all three positions ortho and para to the phenolic hydroxyl group are substituted by groups capable of condensing with the rubber to form cross-linkages have not been successfully used as vulcanizing agents. In accordance with my invention phenolic compounds of the type just described are successfully used to vulcanize certain types of rubber in the presence of carbon black, thus greatly increasing the number of phenolic derivatives which can be used for vulcanizing purposes in place of sulfur.

5. Another advantage of my invention is that whereas no one heretofore has been able to accelerate the vulcanization of rubber by phenolic compounds, I have discovered accelerators for use with my phenol derivatives which allow much more efficient use of vulcanizing equipment by greatly reducing the time of vulcanization.

6. The compounded but unvulcanized stocks made in accordance with the principles of my invention can be processed at higher temperatures without scorching than can stocks containing sulfur as the vulcanizing agent. This is particularly advantageous when shaping articles by injection molding.

The following examples illustrate the invention more fully. All parts mentioned in this specification are by weight.

EXAMPLE 1

| Material | Stock A | Stock B | Stock C | Stock D |
| --- | --- | --- | --- | --- |
| GR-S | 100 | 100 | 100 | 100 |
| Philblack O [a] | | | 50 | 50 |
| 2,4,6-Tris-(dimethylaminomethyl)-phenol | 2 | 50 | | 2 |

[a] A high abrasion furnace black.

These stocks were mixed and heated in a press for 30 minutes at 195° C. They then exhibited the following properties at room temperature:

| Material | Stock A | Stock B | Stock C | Stock D |
| --- | --- | --- | --- | --- |
| Tensile strength (p. s. i.) | 35 | 35 | 250 | 1,860 |
| Elongation (percent) | 1,000+ | 940 | 640 | 500 |
| Modulus at 200% elongation (p. s. i.) | | | 120 | 410 |

The above example shows that the trifunctional phenolic derivative used does not vulcanize GR-S in the absence of carbon black, even when used (stock B) in the proportion recommended by Van der Meer for vulcanizing rubber with difunctional phenolic derivatives. The example also shows that while carbon black alone stiffens rubber and effects a pseudo-vulcanization, the addition of only 2 parts of the phenolic derivative to the carbon black stock effects a spectacular improvement in tensile strength (stock D).

EXAMPLE 2

The following stocks were mixed, vulcanized and tested as in Example 1:

| Stock | Stock D | Stock E | Stock F | Stock G |
|---|---|---|---|---|
| GR-S | 100 | 100 | 100 | 100 |
| Philblack O | 50 | 50 | 50 | 50 |
| 2,4,6-Tris-(dimethylaminomethyl)-phenol | 2 | 4 | 8 | 50 |
| Tensile strength (p. s. i.) | 1,860 | 1,650 | 1,500 | 1,660 |
| Elongation (percent) | 500 | 405 | 315 | 430 |
| Modulus at 200% elongation (p. s. i.) | 410 | 470 | 680 | 390 |

It is evident that 2 parts of the vulcanizing agent used in Example 2 are as effective in vulcanizing GR-S as 50 parts.

EXAMPLE 3

A masterbatch in the proportions 100 GR-S, 50 Philblack O and 2 parts 2,4,6-tris-(dimethylaminomethyl)-phenol was mixed on the mill and triethanolamine was added as shown below to some of the stocks made from it. The nine stocks were vulcanized at 195° C. for the times shown, and tested at room temperature.

| Stock | H-1 | H-2 | H-3 | H-4 | I-1 | I-2 | I-3 | I-4 | I-5 |
|---|---|---|---|---|---|---|---|---|---|
| Masterbatch | 152 | 152 | 152 | 152 | 152 | 152 | 152 | 152 | 152 |
| Triethanolamine | | | | | 3 | 3 | 3 | 3 | 3 |
| Vulcanization time (min.) | 30 | 45 | 60 | 90 | 5 | 10 | 20 | 30 | 60 |
| Tensile strength (p. s. i.) | 1,990 | 2,100 | 2,090 | 1,950 | 1,660 | 2,020 | 2,420 | 2,370 | 2,230 |
| Elongation (percent) | 500 | 440 | 400 | 340 | 630 | 550 | 480 | 455 | 365 |
| Modulus at 300% elongation (p. s. i.) | 860 | 1,130 | 1,290 | 1,600 | 510 | 740 | 1,170 | 1,220 | 1,600 |

It is evident from Example 3 that the tensile strength alone is insufficient to show the state of vulcanization of these stocks. A study of the elongation and modulus indicates that the stiffness of stock increases as the time of vulcanization is increased, thus giving an indication of the state of vulcanization. The I stocks are seen to be equivalent to the H stocks vulcanized twice as long; i. e., the triethanolamine approximately halves the vulcanization time.

EXAMPLE 4

The stocks were mixed, vulcanized at 195° C. for the times shown and tested at room temperature.

| Stock | J-1 | J-2 | K-1 | K-2 | L-1 | L-2 |
|---|---|---|---|---|---|---|
| GR-S | 100 | 100 | 100 | 100 | 100 | 100 |
| Philblack O | 55 | 55 | 55 | 55 | 55 | 55 |
| 2,4,6-Tris-(dimethyl-aminomethyl)-phenol | 2 | 2 | 2 | 2 | 2 | 2 |
| Diethanolamine | | | 2 | 2 | | |
| Triethanolamine | | | | | 3 | 3 |
| Vulcanization time (min.) | 30 | 120 | 30 | 120 | 30 | 120 |
| Tensile strength (p. s. i.) | 275 | 1,270 | 920 | 2,055 | 1,475 | 2,265 |
| Elongation (percent) | 575 | 475 | 645 | 415 | 620 | 410 |
| Modulus at 300% elongation (p. s. i.) | 215 | 790 | 375 | 1,340 | 625 | 1,450 |

The accelerating effect of diethanolamine is shown by Example 4 to be similar to that of triethanolamine.

EXAMPLE 5

The stocks below were mixed, vulcanized and tested unaged (green) as in Example 4. Portions of each were aged for 6 days in air at 100° C., then tested at room temperature.

| Stock | M-1 | M-2 | N-1 | N-2 | O-1 | O-2 |
|---|---|---|---|---|---|---|
| GR-S | 100 | 100 | 100 | 100 | 100 | 100 |
| Philblack O | 55 | 55 | 55 | 55 | 55 | 55 |
| 2,4,6-Tris-(dimethylaminomethyl)-phenol | 2 | 2 | 2 | 2 | 2 | 2 |
| Triethanolamine | | | 3 | 3 | | |
| Diethanolamine | | | | | 2 | 2 |
| Vulcanization time (min.) | 60 | 120 | 60 | 120 | 60 | 120 |
| Tensile strength: | | | | | | |
| Green (p. s. i.) | 830 | 1,270 | 2,185 | 2,265 | 1,990 | 2,055 |
| Aged (p. s. i.) | 770 | 1,480 | 1,945 | 2,160 | 1,865 | 1,875 |
| Change (percent) | −7 | +16 | −11 | −4 | −6 | −9 |
| Elongation: | | | | | | |
| Green (percent) | 510 | 475 | 485 | 410 | 480 | 415 |
| Aged (percent) | 435 | 360 | 285 | 285 | 330 | 270 |
| Change (percent) | −15 | −24 | −41 | −31 | −31 | −35 |
| Modulus at 200% elongation: | | | | | | |
| Green (p. s. i.) | 320 | 455 | 625 | 780 | 560 | 715 |
| Aged (p. s. i.) | 420 | 725 | 1,175 | 1,315 | 965 | 1,225 |
| Change (percent) | +31 | +59 | +88 | +69 | +72 | +71 |

For comparison, a standard stock vulcanized with sulfur was prepared, as follows:

*Stock P*

| | |
|---|---|
| GR-S | 100 |
| Philblack O | 50 |
| Zinc oxide | 5 |
| Paraflux (asphaltic plasticizer) | 5 |
| Stearic acid | 1.5 |
| Sulfur | 2 |
| Mercaptobenzothiazole | 1.5 |
| Diphenyl guanidine | 0.4 |

This stock was vulcanized 45 minutes at 145° C., and a portion aged 2 days in air at 100° C. The test data are:

| | Green | Aged | Change, percent |
|---|---|---|---|
| Tensile strength | 2,700 p. s. i. | 2,000 p. s. i. | −26 |
| Elongation | 510% | 280% | −45 |
| Modulus at 200% elongation | 630 p. s. i. | 1,300 p. s. i. | +106 |

It is evident that the conventional Stock P vulcanized with sulfur has aged (stiffened) proportionately more in two days than have my new stocks in 6 days.

EXAMPLE 6

Portions of a stock consisting of a mixture of 100 parts of GR-S, 50 parts of Philblack O and 4 parts of 2,4,6 - tris - (dimethylaminomethyl) - phenol, were vulcanized at different temperatures, as shown below, and tested at room temperature.

| Stock | Q | E |
|---|---|---|
| Vulcanization temperature (° C.) | 170 | 195 |
| Vulcanization time (min.) | 90 | 30 |
| Tensile strength (p. s. i.) | 1,535 | 1,650 |
| Elongation (percent) | 665 | 405 |
| Modulus at 200% elongation (p. s. i.) | 210 | 470 |

The above example shows that the temperature of vulcanization is not critical. Naturally, the lower the temperature, the longer must be the time of vulcanization.

EXAMPLE 7

The following stocks were mixed as in the preceding examples, vulcanized at 195°, and tested at room temperature.

| Stock | R | S | T | U |
|---|---|---|---|---|
| GR-S | 100 | | | |
| Polybutadiene | | 100 | | |
| Neoprene (polychloroprene) | | | 100 | |
| Butadiene/methyl acrylate (1:1 mol ratio) (Rubbery Copolymer) | | | | 100 |
| Philblack O | 50 | 50 | 35 | 50 |
| 2,4,6-Tris-(dimethylamino-methyl)-phenol | 2 | 2 | 2 | 2 |
| Vulcanization time (min.) | 30 | 30 | 60 | 30 |
| Tensile strength (p. s. i.) a | 1,990 | 1,480 | 1,455 | 1,370 |
| Elongation (percent) a | 500 | 380 | 410 | 350 |
| Modulus at 200% elongation (p. s. i.) a | 400 | 480 | 465 | 530 | a Control stocks identical with these except that the vulcanizing agent was omitted were made and tested with these. The controls showed tensil strengths of 140–310 p. s. i., elongations of 370–670% and moduli at 200% of 100–160 p. s. i.

The above example illustrates the applicability of the vulcanizing process to widely varying diolefin-type synthetic rubbers.

EXAMPLE 8

The following stocks were mixed, vulcanized at 195° C. and tested at room temperature.

| Stock | C | V | W | X | Y | Z |
|---|---|---|---|---|---|---|
| GR-S | 100 | 100 | 100 | 100 | 100 | 100 |
| Philblack O | 50 | 50 | 50 | 50 | 50 | 50 |
| 2,6-Bis-(dimethylaminomethyl)-4-methylphenol | | 2 | | | | |
| 2,4,6-Tris-(1-morpholinomethyl)-phenol | | | 2 | | | |
| 2,4,6-Tris-(diethanolaminomethyl)-phenol | | | | 2 | | |
| 2,4,6-Tris-(dibenzylaminomethyl)-phenol | | | | | 2 | |
| 2,4,6-Tris-(di-n-butylaminomethyl)-phenol | | | | | | 2 |
| Vulcanization time (min.) | 30 | 45 | 90 | 90 | 90 | 90 |
| Tensile strength (p. s. i.) | 250 | 2,150 | 1,005 | 1,050 | 800 | 1,450 |
| Elongation (percent) | 640 | 530 | 525 | 560 | 690 | 555 |
| Modulus at 200% elongation (p. s. i.) | 120 | 390 | 420 | 390 | 260 | 550 |

The above example introduces certain vulcanizing agents of my invention not specifically exemplified in the preceding working examples.

EXAMPLE 9

The following stocks were mixed, vulcanized at 195° C. and tested as described in previous examples.

The above example shows that as little as 0.5 part of the vulcanizing agent made from phenol is effective, and that the agents made from meta-, ortho-, and para-cresol respectively are effective, the agents from meta- and para-cresol being substantially equivalent in vulcanizing strength to that from phenol. This example (Stocks AG and AH) shows that mixed phenolic vulcanizing agents may be used in this invention.

EXAMPLE 10

These stocks were made up like those in Example 9. All were vulcanized 30′.

| Stock | AI | AJ | AK | AL | AM | AN | AO |
|---|---|---|---|---|---|---|---|
| GR-S | 100 | 100 | 100 | 100 | 100 | 100 | 100 |
| Philblack O | 5 | 10 | 20 | 30 | 40 | 50 | 70 |
| 2,4,6-Tris-(dimethylaminomethyl) phenol | 2 | 2 | 2 | 2 | 2 | 2 | 2 |
| Tensile strength (p. s. i.) | 215 | 450 | 955 | 1,440 | 1,570 | 1,930 | 1,670 |
| Elongation (percent) | 350 | 330 | 355 | 580 | 390 | 370 | 380 |
| Modulus at 200% elongation (p. s. i.) | 125 | 165 | 300 | 210 | 430 | 590 | 690 |

This example shows that the carbon black may be varied over wide limits, and that 10 parts or less are insufficient to effect a good vulcanization.

EXAMPLE 11

The following stocks were made up like those in Example 9.

| Stock | AP | AQ | AR | AS | AT |
|---|---|---|---|---|---|
| GR-S | 100 | 100 | 100 | 100 | 100 |
| Philblack O | 50 | 50 | | | |
| Wyex black a | | | 50 | 50 | |
| Shawinigan black b | | | | | 70 |
| Bardol c | | | | | 12 |
| 2,4,6-Tris-(dimethylaminomethyl) phenol | 5 | 5 | 5 | 5 | 3 |
| Triethanolamine | | 5 | | 2 | 3 |
| Vulcanization time (min.) | 45 | 45 | 45 | 45 | 60 |
| Tensile strength (p. s. i.) | 1,900 | 1,640 | 2,340 | 2,010 | 1,300 |
| Elongation (percent) | 240 | 190 | 350 | 280 | 540 |
| Modulus at 200% elongation (p. s. i.) | 1,510 | 1,640 | 970 | 1,290 | 500 | a An easy processing channel black.
b A non-reinforcing acetylene black.
c A refined coal tar distillate used as softener.

The above example shows that the type of carbon black used in this invention is not critical, and that any type of rubber black can be used.

Having thus described my invention, what I claim and desire to protect by Letters Patent is:

1. The method of vulcanizing synthetic rubber selected from the group consisting of homopolymers of an aliphatic conjugated diolefin and copolymers of an aliphatic conjugated diolefin

| Stock | AA | AB | AC | AD | AE | AF | AG | AH |
|---|---|---|---|---|---|---|---|---|
| GR-S | 100 | 100 | 100 | 100 | 100 | 100 | 100 | 100 |
| Philblack O | 50 | 50 | 50 | 50 | 50 | 50 | 50 | 50 |
| 2,4,6-Tris-(dimethylaminomethyl)-phenol | 2.0 | 1.0 | 0.5 | | | | | |
| 2,4,6-Tris-(dimethylaminomethyl)-3-methylphenol | | | | 2.0 | | | 0.8 | 0.4 |
| 2,4-Bis-(dimethylaminomethyl)-6-methylphenol | | | | | 2.0 | | 0.6 | 0.3 |
| 2,6-Bis-(dimethylaminomethyl)-4-methylphenol | | | | | | 2.0 | 0.6 | 0.3 |
| Vulcanized 60′: | | | | | | | | |
|   Tensile strength (p. s. i.) | 2,340 | 1,280 | 950 | 1,720 | 820 | 2,100 | 1,470 | 635 |
|   Elongation (percent) | 450 | 630 | 700 | 580 | 880 | 590 | 650 | 800 |
|   Modulus at 200% elongation (p. s. i.) | 620 | 250 | 195 | 370 | 145 | 375 | 260 | 150 |
| Vulcanized 120′: | | | | | | | | |
|   Tensile strength (p. s. i.) | 1,770 | 1,950 | 1,520 | 2,350 | 1,310 | 2,180 | 2,210 | 1,180 |
|   Elongation (percent) | 250 | 510 | 600 | 380 | 790 | 380 | 550 | 700 |
|   Modulus at 200% elongation (p. s. i.) | | 425 | 300 | 715 | 175 | 845 | 455 | 215 | and another monomer, which copolymers contain copolymerized therein at least 25% of an aliphatic conjugated diolefin, which comprises heating a mixture of said rubber, carbon black in an amount equal to at least 15 parts per 100 parts of said rubber, and a vulcanizing agent comprising a compound derived from phenol by substituting at least two of the three positions ortho and para to the phenolic hydroxyl group with a —CH₂A group where A is a di-substituted amino radical.

2. The method of claim 1 wherein the amount of said vulcanizing agent ranges from 0.25 to 8 parts per 100 parts of said rubber.

3. The method of claim 1 wherein said synthetic rubber is a copolymer of butadiene and styrene.

4. The method of vulcanizing synthetic rubber selected from the group consisting of homo polymers of an aliphatic conjugated diolefin and copolymers of an aliphatic conjugated diolefin and another monomer, which copolymers contain copolymerized therein at least 25% of an aliphatic conjugated diolefin, which comprises heating a mixture of said rubber, carbon black in an amount equal to at least 15 parts per 100 parts of said rubber, and a vulcanizing agent comprising 2,4,6 - tris - (dimethylaminomethyl)- phenol.

5. The method of vulcanizing synthetic rubber selected from the group consisting of homo polymers of an aliphatic conjugated diolefin and copolymers of an aliphatic conjugated diolefin and another monomer, which copolymers contain copolymerized therein at least 25% of an aliphatic conjugated diolefin, which comprises heating a mixture of said rubber, carbon black in an amount equal to at least 15 parts per 100 parts of said rubber, and a vulcanizing agent comprising 2,4,6 - tris - (dimethylaminomethyl) - 3- methylphenol.

6. The method of vulcanizing synthetic rubber selected from the group consisting of homo polymers of an aliphatic conjugated diolefin and copolymers of an aliphatic conjugated diolefin and another monomer, which copolymers contain copolymerized therein at least 25% of an aliphatic conjugated diolefin, which comprises heating a mixture of said rubber, carbon black in an amount equal to at least 15 parts per 100 parts of said rubber, and a vulcanizing agent comprising 2,4- bis-(dimethylaminomethyl) 6-methylphenol.

7. The method of vulcanizing synthetic rubber selected from the group consisting of homo polymers of an aliphatic conjugated diolefin and copolymers of an aliphatic conjugated diolefin and another monomer, which copolymers contain copolymerized therein at least 25% of an aliphatic conjugated diolefin, which comprises heating a mixture of said rubber, carbon black in an amount equal to at least 15 parts per 100 parts of said rubber, and a vulcanizing agent comprising 2,6 - bis - (dimethylaminomethyl)-4- methylphenol.

8. The method of vulcanizing synthetic rubber selected from the group consisting of homo polymers of an aliphatic conjugated diolefin and copolymers of an aliphatic conjugated diolefin and another monomer, which copolymers contain copolymerized therein at least 25% of an aliphatic conjugated diolefin, which comprises heating a mixture of said rubber, carbon black in an amount equal to at least 15 parts per 100 parts of said rubber, and a vulcanizing agent comprising a mixture of 2,4,6-tris-(dimethylaminomethyl)-3- methylphenol, 2,4 - bis-(dimethylaminomethyl)- 6 - methylphenol and 2,6 - bis-(dimethylaminomethyl)-4-methylphenol.

9. The method of claim 1 wherein said mixture also contains an alkanolamine as a vulcanization accelerator.

10. A vulcanizate of a mixture of synthetic rubber selected from the group consisting of homo polymers of an aliphatic conjugated diolefin and copolymers of an aliphatic conjugated diolefin and another monomer, which copolymers contain copolymerized therein at least 25% of an aliphatic conjugated diolefin, carbon black in an amount equal to at least 15 parts per 100 parts of said rubber, and a vulcanizing agent comprising a compound derived from phenol by substituting at least two of the three positions ortho and para to the phenolic hydroxyl group with a —CH₂A group where A is a tertiary amino radical.

11. A vulcanizate as set forth in claim 10 wherein the amount of said vulcanizing agent ranges from 0.25 to 8 parts per 100 parts of said rubber.

12. A vulcanizate as set forth in claim 10 wherein said synthetic rubber is a copolymer of butadiene and styrene.

13. A vulcanizate of a mixture of synthetic rubber selected from the group consisting of homo polymers of an aliphatic conjugated diolefin and copolymers of an aliphatic conjugated diolefin and another monomer, which copolymers contain copolymerized therein at least 25% of an aliphatic conjugated diolefin, carbon black in an amount equal to at least 15 parts per 100 parts of said rubber, and a vulcanizing agent comprising 2,4,6-tris-(dimethylaminomethyl) phenol.

14. A vulcanizate of a mixture of synthetic rubber selected from the group consisting of homo polymers of an aliphatic conjugated diolefin and copolymers of an aliphatic conjugated diolefin and another monomer, which copolymers contain copolymerized therein at least 25% of an aliphatic conjugated diolefin, carbon black in an amount equal to at least 15 parts per 100 parts of said rubber, and a vulcanizing agent comprising 2,4,6-tris-(dimethylaminomethyl)-3-methyl- phenol.

15. A vulcanizate of a mixture of synthetic rubber selected from the group consisting of homo polymers of an aliphatic conjugated diolefin and copolymers of an aliphatic conjugated diolefin and another monomer, which copolymers contain copolymerized therein at least 25% of an aliphatic conjugated diolefin, carbon black in an amount equal to at least 15 parts per 100 parts of said rubber, and a vulcanizing agent comprising 2,4 - bis - (dimethylaminomethyl) - 6 - methylphenol.

16. A vulcanizate of a mixture of synthetic rubber selected from the group consisting of homo polymers of an aliphatic conjugated diolefin and copolymers of an aliphatic conjugated diolefin and another monomer, which copolymers contain copolymerized therein at least 25% of an aliphatic conjugated diolefin, carbon black in an amount equal to at least 15 parts per 100 parts of said rubber, and a vulcanizing agent comprising 2,6 - bis - (dimethylaminomethyl) - 4 - methylphenol.

17. A vulcanizate of a mixture of synthetic rubber selected from the group consisting of homo polymers of an aliphatic conjugated diolefin and copolymers of an aliphatic conjugated diolefin and another monomer, which copolymers contain copolymerized therein at least 25% of an aliphatic conjugated diolefin, carbon black in an amount equal to at least 15 parts per 100 parts of said rubber, and a vulcanizing agent comprising a mixture of 2,4,6-tris-(dimethylaminomethyl)-3-methylphenol, 2,4-bis-(dimethylaminomethyl)-6-methylphenol and 2,6-bis-(dimethylaminomethyl)-4-methylphenol.

18. A vulcanizate as set forth in claim 10 wherein said mixture also contains an alkanolamine as a vulcanization accelerator.

JULIAN R. LITTLE.

References Cited in the file of this patent

Ser. No. 357,662, Wildschut (A. P. C.), published Apr. 20, 1943.